3,479,346
N-ACYL-N- (AND N,N-BIS-) [(1-PIPERIDYL)-LOWER-ALKYL]AMINES
Bernard L. Zenitz, Colonie, and Alexander R. Surrey, Albany, N.Y., assignors to Sterling Drug Inc., New York, N.Y., a corporation of Delaware
No Drawing. Continuation-in-part of application Ser. No. 432,845, Feb. 15, 1965. This application Nov. 25, 1966, Ser. No. 596,811
Int. Cl. C07d *29/30, 29/12, 51/64*
U.S. Cl. 260—240
39 Claims

ABSTRACT OF THE DISCLOSURE

N-acyl-N- (and N,N-bis-) [(1-piperidyl)-lower-alkyl] amines, for example N-benzoyl-N,N-bis-[3-(4-cyclohexylmethyl-1-piperidyl)propyl]amine, having chemotherapeutic and pharmacodynamic, particularly anti-inflammatory, coronary dilator, hypotensive, anti-fungal, anti-viral, anthelmintic, and psychomotor depressant activities, prepared by acylation of the corresponding N- (and N,N-bis-) [(1-piperidyl)-lower-alkyl]amines.

---

This application is a continuation-in-part of our prior copending application Ser. No. 432,845, filed Feb. 15, 1965 now U.S. Patent No. 3,325,500, which in turn is a continuation-in-part of our prior filed application S.N. 129,995, filed Aug. 8, 1961, and now abandoned.

This invention relates to N-acyl - N - [(1-piperidyl)-lower-alkyl]amines, their acid-addition salts, and to processes for the preparation thereof.

Said amines have utility as chemotherapeutic and pharmacodynamic agents of a nature to be more fully described hereinafter.

The compounds of the instant invention are represented by the formula:

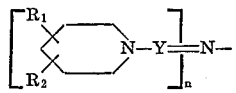

I wherein $R_1$ is lower-alkyl, unsubstituted-carbamyl, N-lower-alkylcarbamyl, N,N-di-lower-alkylcarbamyl, piperidinocarbonyl, pyrrolidinocarbonyl, hydroxy, lower-alkoxy, phenoxy, naphthoxy, phenyl-lower-alkoxy, naphthyl-lower-alkoxy, hydroxy - lower - alkyl, lower-alkoxy-lower-alkyl, phenoxy - lower - alkyl, naphthoxy-lower-alkyl, lower-alkanoylamino, phenyl-lower-alkyl, cycloalkyl-lower-alkyl, or the group

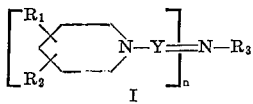

where $R_4$ is phenyl, naphthyl, pyridyl, 3- or 4-piperidyl substituted on the nitrogen atom by lower-alkyl, lower-alkanoyl, phenyl-lower-alkyl, or benzoyl; $R_5$ is lower-alkyl, lower-alkanoyl, phenyl-lower-alkyl, benzoyl, carbamyl, N-lower-alkyl-carbamyl, N,N - di - lower-alkylcarbamyl, or carbo-lower-alkoxy, or $R_4$ and $R_5$ taken together with the nitrogen atom to which they are attached form a heterocyclic ring, for example, isoindolinyl, pyrrolidyl, piperidyl, or piperazinyl substituted on the 4-nitrogen atom by lower-alkyl, lower-alkanoyl, phenyl, phenyl-lower-alkyl, or benzoyl; $R_2$ is hydrogen or from one to five lower-alkyl radicals; $R_3$ is benzoyl, phenyl-lower-alkanoyl, lower-alkanoyl, halo-lower-alkanoyl, cycloalkanecarbonyl, cycloalkyl-lower-alkanoyl, carboxy-cycloalkylcarbonyl, phenoxy - lower - alkanoyl, phenyl-lower-alkenoyl, carboxy-lower-alkanoyl, phenyl-sulfonyl, ω-(1-piperidyl) - lower - alkanoyl, or lower-alkyl-keto-lower-alkanoyl; Y is lower-alkylene containing from two to eight carbon atoms and interposing at least two carbon atoms between the amino nitrogen atom of the (1-piperidyl)-lower-alkylamino group and the ring nitrogen atom of the piperidine nucleus; and $n$ is one of the integers 1 and 2. The variable $R_3$ in the compounds of formula I above can also be a divalent radical joining two of the groupings:

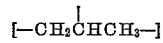

together [hereinafter referred to as (1-piperidyl)-lower-alkylamino radicals], including a divalent residue of a dibasic carboxylic acid, CO—Y″—CO where Y″ is a single bond or lower-alkylene containing from one to four carbon atoms, e.g. —COCO— (from oxalic acid),

—COCH$_2$CH$_2$CO—

(from succinic acid), and the like.

In the above general Formula I, $R_2$ stands for hydrogen or from one to five lower-alkyl radicals. When $R_2$ is one or more lower-alkyl radicals, each lower-alkyl radical can be straight or branched and can occupy any of the five available positions on the piperidine ring, and when $R_2$ is more than one lower-alkyl radical, said radicals can be the same or different and can occupy the same or different positions on the piperidine ring.

As used herein the terms lower-alkyl, lower-alkoxy, or lower-alkanoyl, mean such groups containing from one to ten carbon atoms which can be either straight or branched and thus represent, inter alia, methyl, ethyl, n-propyl, isopropyl, n-butyl, n-hexyl, methoxy, ethoxy, propoxy, isopropoxy, butoxy, hexyloxy, formyl, acetyl, propionyl, isobutyryl, caproyl, decanoyl, and the like.

As used herein the term cycloalkyl means cycloalkyl containing from three to seven ring carbon atoms, and thus represents, inter alia, cyclopropyl, cyclobutyl, cyclopentyl, cyclohexyl, or cycloheptyl.

In the above general Formula I, Y is lower-alkylene containing from two to eight carbon atoms and interposing at least two carbon atoms between the amino nitrogen atom of the (1-piperidyl)-lower-alkylamino group and the ring nitrogen atom of the piperidine nucleus. The lower-alkylene group can be straight or branched and thus stands, inter alia, for 1,2-ethylene [—CH$_2$CH$_2$—], 1,3-propylene [—(CH$_2$)$_3$—], 1,2-(2-methylethylene)

1,4-butylene[ —(CH$_2$)$_4$—], 1,5-pentylene [—(CH$_2$)$_5$—], 1,6-hexylene [—(CH$_2$)$_6$—], 1,7-heptylene [—(CH$_2$)$_7$—], 1,8-octylene [—(CH$_2$)$_8$—], and the like.

The compounds of Formula I where $R_3$ is benzoyl, phenyl-lower-alkanoyl, lower-alkanoyl, halo-lower-alkanoyl, cycloalkanecarbonyl, cycloalkyl - lower - alkanoyl, carboxy-cycloalkylcarbonyl, phenoxy - lower - alkanoyl, phenyl-lower-alkenoyl, carboxy-lower-alkanoyl, phenyl-sulfonyl, ω-(1-piperidyl)-lower alkanoyl, lower-alkyl-keto-lower-alkyl, or a divalent residue of a dibasic carboxylic acid are prepared by reaction of the corresponding primary or secondary amines, of the formula

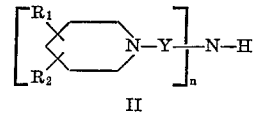

II where $R_1$, $R_2$, Y, and $n$ have the meanings given above, with the acid halide corresponding to $R_3$. The reaction is preferably conducted in an organic solvent inert under the conditions of the reaction, for example, benzene, toluene, xylene, dioxane, and the like, and at a temperature in the range from 50° C. to 150° C. The reaction can, if desired, be carried out in the presence of an acid-acceptor to take up the hydrogen halide split out during the course of the reaction. Suitable acid-acceptors are alkali metal hydroxides, for example, sodium or potassium hydroxide, alkali metal carbonates or bicarbonates, for example, sodium or potassium carbonate or sodium or potassium bicarbonate, or an excess of the amine starting material.

The compounds of Formula I, where $R_3$ is benzoyl, phenyl - lower - alkanoyl, lower-alkanoyl, halo-lower-alkanoyl, cycloalkanecarbonyl, cycloalkyl-lower-alkanoyl, carboxycycloalkylcarbonyl, phenoxy - lower - alkanoyl, phenyl-lower-alkenoyl, carboxy-lower-alkanoyl, ω - (1-piperidyl) - lower - alkanoyl, lower-alkyl-keto-lower-alkanoyl, or a divalent residue of a dibasic carboxylic acid, can also be prepared by reacting the compounds of Formula II with a carboxylic acid corresponding to $R_3$ in the presence of a lower-alkyl haloformate and an acid-acceptor. The purpose of the acid-acceptor is to take up the hydrogen halide split out during the course of the reaction. The reaction is preferably carried out in an organic solvent inert under the conditions of the reaction, for example, acetone, ether, tetrahydrofuran, benzene, and the like.

Another method for preparing the compounds of Formula I where $R_3$ is benzoyl, lower-alkanoyl, cycloalkanecarbonyl, carboxycycloalkylcarbonyl, or a divalent residue of a dibasic carboxylic acid, and which can also be used to prepare the compounds of Formula I where $R_3$ is lower-alkyl-keto-lower-alkanoyl or carboxy-lower-alkanoyl comprises reacting the secondary amines of Formula II with the corresponding acid anhydride. The reaction is preferably conducted in an organic solvent inert under the conditions of the reaction, for example, benzene, toluene, xylene, dioxane, and the like, and at a temperature in the range from 20° C. to 150° C. The reaction is preferably carried out in the presence of a basic catalyst for example, pyridine or triethylamine.

The compounds of Formula I where $R_3$ is β-phenylpropionyl are advantageously prepared from the corresponding N-cinnamoyl compound ($R_3$ is cinnamoyl or unsubstituted cinnamoyl, which in turn are prepared by reaction of the secondary amine with a cinnamoyl halide as described above) by catalytic reduction of the cinnamamide with hydrogen. The compounds where $R_3$ is β-phenylpropionyl are produced when reduction is stopped after the uptake of one mole of hydrogen, and the compounds where $R_3$ is β-cyclohexylpropionyl are produced if the reduction is allowed to proceed to the uptake of four moles of hydrogen. The reaction is conducted in an organic solvent inert under the conditions of the reaction, for example, methanol, ethanol, propanol, and the like, and at hydrogen pressures in the range from 40 to 100 pounds p.s.i. Suitable catalysts are palladium-on-charcoal, platinum oxide and palladium oxide.

The mono- and bis-[(1-piperidyl)-lower-alkyl]amines of Formula II, used as starting materials for the preparation of the compounds of Formula I, are prepared by reducing, with hydrogen in the presence of a catalyst, a 1-(cyano-lower-alkyl)piperidine having the formula

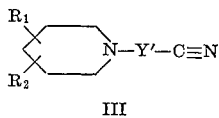

III where $R_1$ and $R_2$ have the meanings given above; and Y' is lower-alkylene containing from one to seven carbon atoms and interposing at least one carbon atom between the ring nitrogen atom of the piperidine nucleus and the cyano group.

The reduction of the compounds of Formula III is carried out in an organic solvent inert under the conditions of the reaction, for example, methanol, ethanol, or isopropanol, at a temperature in the range from about 20° C. to about 70° C. and at hydrogen pressures in the range from about 40 pounds p.s.i. to about 1,000 pounds p.s.i. When the reduction is carried out in a neutral medium, the bis-[(1-piperidyl)-lower-alkyl]amines of Formula II ($n$ is 2) are the predominant products although the mono-[(1-piperidyl)-lower-alkyl]amines ($n$ is 1) are also produced. On the other hand, if the solvent used is first saturated with anhydrous ammonia, so that the reaction medium is strongly ammoniacal, the predominant products are the mono-[(1-piperidyl)-lower-alkyl]amines, although the bis - [(1 - piperidyl)-lower-alkyl]amines are also produced in minor amounts. Suitable catalysts are platinum oxide, palladium-on-charcoal, and rhodium-on-alumina. A preferred catalyst is rhodium-on-alumina.

The 1-(cyano-lower-alkyl)piperidines of Formula III are disclosed in and are prepared by methods described in our U.S. Patent 3,262,936 (patented July 26, 1966). These methods comprise, for example, reacting an acrylonitrile with a piperidine in the presence of a basic catalyst, a method used for the preparation of the compounds where Y' is lower-alkylene interposing two carbon atoms between the cyano group and the ring nitrogen atom of the piperidine nucleus. The reaction is represented by the equation:

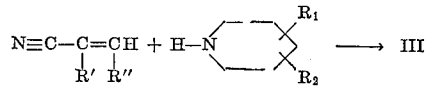

where $R_1$ and $R_2$ have the meanings given above and each of R' and R" stands for hydrogen or the methyl radical, or one of R' and R" is hydrogen while the other is the ethyl radical. The reaction is preferably carried out in a solvent inert under the conditions of the reaction, for example, water, benzene, dioxane, pyridine, or acetonitrile. The reaction is also advantageously carried out in an excess of acrylonitrile. Suitable basic catalysts are tri-lower-alkylamines, for example triethylamine, or basic tertiary heterocyclic amines, for example, pyridine, or quaternary ammonium hydroxides, for example, Triton B® (benzyl trimethylammonium hydroxide). A preferred basic catalyst is triethylamine.

The compounds of Formula III where Y' is lower-alkylene interposing from one to seven carbon atoms between the cyano group and the ring nitrogen atom of the piperidine nucleus are prepared by reacting a cyano-lower-alkyl halide with an appropriate substituted-piperidine in the presence of an acid-acceptor. The reaction is preferably carried out in an organic solvent inert under the conditions of the reaction, for example, tetrahydrofuran, acetone, methanol, ethanol, isopropanol, and the like. The purpose of the acid-acceptor is to take up the hydrogen halide split out during the course of the reaction and is a basic substance which forms water-soluble by-products easily separable from the main product of the reaction and includes such substances as alkali metal salts of weak acids, e.g. sodium carbonate, sodium bicarbonate, potassium carbonate, sodium acetate, and the like. The acid-acceptor can also be in the form of an excess quantity of the substituted-piperidine.

The novel compounds of the instant invention are the compounds of Formula I and their acid-addition salts. The compounds of Formula I, in free base form, are converted to the acid-addition salt form by interaction of the base with an acid. In like manner, the free bases can be regenerated from the acid-addition salt form in the conventional manner, that is, by treating the salts with strong aqueous bases, for example, alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formula I not only represents the structural configuration of the bases of the invention but is also representative of the structural entity which is common to all of our compounds of Formula I, whether in the form of the free bases or in the form of the acid-addition salts of the bases. We have found that by virtue of this common structural entity, the bases and their acid-addition salts have inherent pharmacodynamic and chemotherapeutic activity of a type to be more fully described hereinbelow. This inherent pharmacodynamic and chemotherapeutic activity can be enjoyed in useful form for pharmaceutical purposes by employing the free bases themselves or the acid-addition salts formed from pharmaceutically-acceptable acids, that is acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, our salts are useful as characterizing or identifying derivatives of the free bases or in isolation or purification procedures. Like all of the acid-addition salts, such characterizing or purification salt derivatives, can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of our new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new N-acyl-[(1-piperidyl)-lower-alkyl] amines and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids; such as found, for example, in Beilstein's Organische Chemie, 4th ed., volumes III, IV, IX, X, XIV, XVII, XIX, XXI, XXII, XXV; organic mono- and polysulfonic and -sulfinic acids; such as found, for example, in Beilstein Volumes VI, XI, XVI, and XXII; organic phosphonic and phosphinic acids; such as found, for example, in Beilstein Volumes XI and XVI; organic acids of arsenic and antimony; such as found, for example, in Beilstein Volume XVI; organic heterocyclic carboxylic, sulfonic, and sulfinic acids; such as found, for example, in Beilstein Volumes XVIII, XXII, and XXV; acidic ion-exchange resins; and inorganic acids of any acid-forming element or combination of elements, such as found in Mellor, Comprehensive Treatise on Inorganic and Theoretical Chemistry, Longman's, Green and Co., New York, N.Y., volumes I–XVI. In addition, other salt-forming compounds which are acidic in their chemical properties, but which are not generally considered as acids in the same sense as carboxylic or sulfonic acids, are also considered to be among the numerous acids which can be used to prepare acid-addition salts of the compounds of the invention. Thus there is also comprehended acidic phenolic compounds, such as found, for example, in Volume VI of Beilstein, acidic compounds having "activated" or acidic hydrogen atoms, as for example, picrolonic acid, or barbituric acid derivatives having an acidic proton, such as found, for example, in Cox et al. Medicinal Chemistry vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example, boron trifluoride.

Thus appropriate acid-addition salts are those derived from such diverse acids as formic acid, acetic acid, isobutyric acid, alpha-mercaptopropionic acid, malic acid, fumaric acid, succinic acid, tartaric acid, citric acid, lactic acid, benzoic acid, 4-methoxybenzoic acid, phathalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I have shown that they possess pharmacodynamic and chemotherapeutic properties, in particular, anti-inflammatory, coronary dilator, hypotensive, anti-fungal, anti-viral, anthelmintic, and psychomotor depressant activities, thus indicating their usefulness as anti-inflammatory, anti-fungal, anti-viral, and blood pressure lowering agents, coronary dilators, anthelmintics, and tranquilizers.

The structures of the compounds of the invention are established by their mode of synthesis and corroborated by the correspondence between calculated values for the elements and values found by chemical analysis.

The following examples will further illustrate the invention without the latter being limited thereto.

EXAMPLE 1

3-(4-carbamyl-1-piperidyl)propylamine [II: $R_1$ is 4-$CONH_2$; $R_2$ is H; Y is $(CH_2)_3$; $n$ is 1]

To a solution of 34.75 g. (0.19 mole) of 1,(2-cyanoethyl)-4-carbamylpiperidine in 450 ml. of ethanol saturated with anhydrous ammonia was added 4.2 g. of a 5% rhodium-on-alumina catalyst. The mixture was reduced with hydrogen under an initial pressure of 210 pounds p.s.i. at a temperature of 25° C. Reduction was complete in three hours. The catalyst was removed by filtration, washed with ethanol, the filtrate concentrated to dryness in vacuo and the white crystalline residue extracted with acetone, filtered, and the filtrate taken to dryness yielding 25.4 g. of a white powder which was recrystallized twice from a benzene-hexane mixture giving 22.0 g. of 3-(4-carbamyl - 1 - piperidyl)propylamine, M.P. 85–88° C. (uncorr.).

EXAMPLE 2

N,N-bis-[6-(4-cyclohexylmethyl-1-piperidyl)hexyl]amine
[II: $R_1$ is 4-$C_6H_{11}CH_2$; $R_2$ is H; Y is $(CH_2)_6$; $n$ is 2]

(a) 1 - (5 - cyanopentyl) - 4 - cyclohexylmethylpiperidine (55.3 g., 0.2 mole) was dissolved in 250 ml. of ethanol and reduced over 4.5 g. of a rhodium-on-alumina catalyst under 60 pounds p.s.i. of hydrogen. When reduction was completed, the catalyst was removed by filtration and the residue distilled in vacuo, all material (22.7 g.) boiling at 117–128° C./0.046–0.055 mm. being collected as 6 - (4 - cyclohexylmethyl - 1 - piperidyl)hexylamine. A small amount of the latter in isopropanol was converted to the dihydrochloride salt and recrystallized twice from ethanol-acetone to give 6-(4-cyclohexylmethyl-1-piperidyl) hexylamine dihydrochloride, M.P. 231.6–236.2° C.

Analysis.—Calcd. for $C_{18}H_{36}N_2 \cdot 2HCl$: C, 61.17%; H, 10.84%; Cl, 20.07%. Found: C, 61.20%; H, 10.71%; Cl, 19.63%.

(b) The pot residue remaining after distillation of the primary amine and recrystallized several times from acetoneethanol to give 26.6 g. of N,N-bis-[6-(4-cyclohexylmethyl-1-piperidyl)hexyl]amine, M.P. 53.5–54.5° C.

Analysis.—Calcd. for $C_{36}H_{69}N_3$: C, 75.49%; H, 12.79%; N, 7.72%. Found: C, 79.33%; H, 12.73%; N, 7.59%.

EXAMPLES 3–17

The following mono-[(1-piperidyl)-lower-alkyl]amines of Formula II [$n$ is 1; $R_2$ is H] listed below in Table 1 are prepared according to one of the procedures described above in Example 1 or 2 by reduction of an appropriate 1-($\omega$-cyano-lower-alkyl)piperidine of Formula III with hydrogen over a rhodium-on-alumina catalyst. All melting points are corrected.

TABLE 1

| Example | $R_1$ | Y | Base or Salt | M.P. (° C.) | Cryst. from— |
|---|---|---|---|---|---|
| 3 | 4-CONHCH$_3$ | (CH$_2$)$_3$ | 2HCl | 239.6–240.6 | Ethanol/ether. |
| 4 | 4-CONHC$_2$H$_5$ | (CH$_2$)$_3$ | 2HCl | 245.0–246.2 | Do. |
| 5 | 4-CON(CH$_3$)$_2$ | (CH$_2$)$_3$ | Base | (a) | |
| 6 | 4-CON(C$_2$H$_5$)$_2$ | (CH$_2$)$_3$ | Base | (b) | |
| 7 | 4-CH$_2$C$_6$H$_5$ | (CH$_2$)$_3$ | 2HCl | 191.6–193.4 | Do. |
| 8 | 4-CH$_2$C$_6$H$_{11}$ | (CH$_2$)$_3$ | 2HCl | 280.2–282.4 | Do. |
| 9 | 4-HO | (CH$_2$)$_3$ | Base | (c) | |
| 10 | 4-HO(CH$_2$)$_3$ | (CH$_2$)$_3$ | Base | 163.8–165.2 | Isopropanol. |
| 11 | 4-(CH$_3$)$_2$CH | (CH$_2$)$_3$ | 2HCl | 215.2–217.8 | Do. |
| 12 | 3-CH$_3$CONH | (CH$_2$)$_3$ | Base | (d) | |
| 13 | 4-CH$_2$C$_6$H$_{11}$ | (CH$_2$)$_2$ | 2HCl | 259.8–262.8 | Ethanol/acetone. |
| 14 | 2-CH$_2$C$_6$H$_{11}$ | (CH$_2$)$_3$ | 2HCl | 200.0–206.8 | Isopropanol. |
| 15 | 4-CH$_2$C$_6$H$_{11}$ | (CH$_2$)$_4$ | 2HCl | 262.8–266.0 | Do. |
| 16 | 4-CH$_2$C$_6$H$_{11}$ | (CH$_2$)$_5$ | 2HCl | 250.6–257.2 | Do. |
| 17 | 4-CH$_2$C$_6$H$_{11}$ | (CH$_2$)$_7$ | 2HCl | 247.0–249.6 | Acetone. | a B.P. 123–124° C./0.09 mm.; $n_D^{25}$=1.5042.
b B.P. 131–138° C./0.109–0.113 mm.; $n_D^{25}$=1.4938.
c B.P. 85.3–86.8° C./0.033 mm.; $n_D^{25}$=1.5050.
d B.P. 147–157° C./0.045–0.095 mm.; $n_D^{25}$=1.5070.

EXAMPLES 18–33

The following N,N - bis - [(1-piperidyl)-lower-alkyl]-amines of Formula II [$n$ is 2; $R_2$ is H] listed below in Table 2 are prepared according to one of the procedures described above in Example 1 or 2 by reduction of an appropriate 1-($\omega$-cyano-lower-alkyl)piperidine of Formula III with hydrogen over a rhodium-on-alumina catalyst. All melting points are corrected.

TABLE 2

| Example | $R_1$ | Y | Salt | M.P. (° C.) | Crystd. from— |
|---|---|---|---|---|---|
| 18 | 4-CONHCH$_3$ | (CH$_2$)$_3$ | Base | 203.0–203.8 | Ethanol/acetone. |
| 19 | 4-CONHC$_2$H$_5$ | (CH$_2$)$_2$ | Base | 191.2–192.8 | |
| 20 | 4-CON(CH$_3$)$_2$ | (CH$_2$)$_3$ | Base | 87.8–88.6 | Hexane. |
| 21 | 4-CH$_2$C$_6$H$_5$ | (CH$_2$)$_3$ | 3HCl | 266.6–268.0 | Ether. |
| 22 | 4-CH$_2$C$_6$H$_{11}$ | (CH$_2$)$_3$ | 3HCl | >300 | Isopropanol/ether. |
| 23 | 4-(CH$_3$)$_2$CH | (CH$_2$)$_3$ | Base | (a) | |
| 24 | 4-HO | (CH$_2$)$_3$ | Base | (b) | |
| 25 | 4-HO(CH$_2$)$_3$ | (CH$_2$)$_3$ | 3HCl | 191.2–199.4 | Isopropanol. |
| 26 | 4-CH$_2$C$_6$H$_{11}$ | (CH$_2$)$_2$ | 3HCl | 294.4–298.2 | Ethanol. |
| 27 | 4-CH$_2$C$_6$H$_{11}$ | (CH$_2$)$_3$ | Base | 37.2–43.0 | Acetone. |
| 28 | 2-CH$_2$C$_6$H$_{11}$ | (CH$_2$)$_3$ | 3HCl | 179.2–192.4 | Do. |
| 29 | 4-CH$_2$C$_6$H$_{11}$ | (CH$_2$)$_4$ | Base | 50.2–51.0 | Hexane. |
| 30 | 4-CH$_2$C$_6$H$_{11}$ | (CH$_2$)$_5$ | Base | 57.2–58.5 | Acetone. |
| 31 | 4-CH$_2$C$_6$H$_{11}$ | (CH$_2$)$_7$ | Base | 63.6–64.4 | Do. |
| 32 | 4-C$_6$H$_5$NCOCH$_3$ | (CH$_2$)$_3$ | 3HCl | 247.8–251.0 | Methanol/acetone. |
| 33 | 4-C$_6$H$_5$NCH$_3$ | (CH$_2$)$_3$ | 3H$_2$O | 88–100 | Acetone/water | a B.P. 125.5–131.0° C./0.0015 mm.; $n_D^{25}$=1.4832. Trihydrochloride, recrystallized from isopropanol, gave M.P. 291.2–293.4° C. (corr.).
b B.P. 186–193° C./0.002–0.0024 mm.; $n_D^{25}$=1.5197.

EXAMPLES 34–74

By following the manipulative procedure described above in Example 1, substituting for the 1-(2-cyanoethyl)-4-carbamylpiperidine used therein, a molar equivalent amount of an appropriate 1-(cyano-lower-alkyl)-substituted-piperidine, there can be obtained the (substituted-1-piperidyl)-lower alkylamines of Formula II ($n$ is 1) listed above in Table 3.

EXAMPLES 75–113

By following the manipulative procedure described above in Example 2, substituting for the 1-(5-cyanopentyl)-4-cyclohexylmethylpiperidine used therein, a molar equivalent amount of an appropriate 1-(cyano-lower-alkyl)-substituted-piperidine, there can be obtained the N,N-bis-[(substituted - 1 - piperidyl)-lower-alkyl]amines of Formula II ($n$ is 2) listed below in Table 4.

TABLE 3

| Example | Y | $R_1$ | $R_2$ |
|---|---|---|---|
| 34 | $(CH_2)_3$ | 4-$CH_2OH$ | H |
| 35 | $(CH_2)_3$ | 4-$CH_2CH_2CH_2OH$ | H |
| 36 | $(CH_2)_2$ | 4-HO | 2,6-$(CH_3)_2$ |
| 37 | $(CH_2)_5$ | 4-HO | 2,2,4,6,6-$(CH_3)_5$ |
| 38 | $(CH_2)_3$ | 4-HO | 2,2-$(CH_3)_2$-6-$(CH_3)_2CHCH_2$ |
| 39 | $(CH_2)_3$ | 4-$(CH_2)_6OH$ | H |
| 40 | $(CH_2)_3$ | 4-NHCHO | H |
| 41 | $(CH_2)_3$ | 4-NHCOCH$(C_2H_5)CH_2CH_3$ | H |
| 42 | $(CH_2)_3$ | 3-CONHCH$_2$CH$_2$CH$_2$CH$_3$ | H |
| 43 | $(CH_2)_3$ | 4-CON$C_5H_{10}$ | H |
| 44 | $(CH_2)_3$ | 4-CON$C_4H_8$ | H |
| 45 | $(CH_2)_3$ | 4-$C_6H_5O$ | H |
| 46 | $(CH_2)_3$ | 4-(2-naphthyl-O-) | H |
| 47 | $(CH_2)_3$ | 4-$C_6H_5CH_2CH_2O$ | H |
| 48 | $(CH_2)_3$ | 4-(2-napthyl-$CH_2CH_2$-O) | H |
| 49 | $(CH_2)_3$ | 3-$CH_3O$ | H |
| 50 | $(CH_2)_4$ | 4-$C_2H_5O(CH_2)_3$ | H |
| 51 | $(CH_2)_2$ | 3-(4-Cl$C_6H_4OCH_2CH_2$) | H |
| 52 | $(CH_2)_5$ | 4-[(2-naphthyl)-O-$(CH_2)_2$] | H |
| 53 | $(CH_2)_3$ | 4-$C_6H_5\overset{\mid}{N}CH_3$ | H |
| 54 | $(CH_2)_3$ | 4-$C_6H_5\overset{\mid}{N}COCH_3$ | H |
| 55 | $(CH_2)_3$ | 4-$C_6H_5\overset{\mid}{N}CH_2CH_2C_6H_5$ | H |
| 56 | $(CH_2)_4$ | 4-$C_6H_5\overset{\mid}{N}COC_6H_5$ | H |
| 57 | $(CH_2)_2$ | 2-naphthyl-N$CH_3$ | H |
| 58 | $(CH_2)_3$ | 4-(4-$C_5H_4N$)N$CH_3$ | H |
| 59 | $(CH_2)_3$ | 4-(1-methyl-3-piperidyl)N$CH_3$ | H |
| 60 | $(CH_2)_3$ | 4-(1-acetyl-3-piperidyl)N$CH_3$ | H |
| 61 | $(CH_2)_3$ | 4-(1-phenethyl-3-piperidyl)N$CH_3$ | H |
| 62 | $(CH_2)_3$ | 4-(1-benzoyl-3-piperidyl)N$CH_3$ | H |
| 63 | $(CH_2)_3$ | 4-$C_6H_5\overset{\mid}{N}CONH_2$ | H |
| 64 | $(CH_2)_3$ | 4-$C_6H_5\overset{\mid}{N}CONHCH_3$ | H |
| 65 | $(CH_2)_3$ | 4-$C_6H_5\overset{\mid}{N}CON(CH_3)_2$ | H |
| 66 | $(CH_2)_3$ | 4-$C_6H_5\overset{\mid}{N}COOC_2H_5$ | H |
| 67 | $(CH_2)_3$ | 4-(2-isoindolinyl) | H |
| 68 | $(CH_2)_3$ | 4-(1-pyrrolidyl) | H |
| 69 | $(CH_2)_3$ | 4-(1-piperidyl) | H |
| 70 | $(CH_2)_3$ | 4-(4-methyl-1-piperazinyl) | H |
| 71 | $(CH_2)_3$ | 4-(4-acetyl-1-piperazinyl) | H |
| 72 | $(CH_2)_3$ | 4-(4-phenyl-1-piperazinyl) | H |
| 73 | $(CH_2)_3$ | 4-(4-phenethyl-1-piperazinyl) | H |
| 74 | $(CH_2)_3$ | 4-(4-benzoyl-1-piperazinyl) | H |

TABLE 4

| Example | Y | $R_1$ | $R_2$ |
|---|---|---|---|
| 75 | $(CH_2)_3$ | 4-$CH_2OH$ | H |
| 76 | $(CH_2)_3$ | 4-$CH_2CH_2CH_2OH$ | H |
| 77 | $(CH_2)_2$ | 4-HO | 2,6-$(CH_3)_2$ |
| 78 | $(CH_2)_5$ | 4-HO | 2,2,4,6,6-$(CH_3)_5$ |
| 79 | $(CH_2)_3$ | 4-HO | 2,2-$(CH_3)_2$-6-$(CH_3)_2CHCH_2$ |
| 80 | $(CH_2)_3$ | 4-$(CH_2)_6OH$ | H |
| 81 | $(CH_2)_3$ | 4-NHCHO | H |
| 82 | $(CH_2)_3$ | 4-NHCOCH$(C_2H_5)CH_2CH_3$ | H |
| 83 | $(CH_2)_3$ | 3-CONHCH$_2$CH$_2$CH$_2$CH$_3$ | H |
| 84 | $(CH_2)_3$ | 4-CON$C_5H_{10}$ | H |
| 85 | $(CH_2)_3$ | 4-CON$C_4H_8$ | H |
| 86 | $(CH_2)_3$ | 4-$C_6H_5O$ | H |
| 87 | $(CH_2)_3$ | 4-(2-naphthyl-O) | H |
| 88 | $(CH_2)_3$ | 4-$C_6H_5CH_2CH_2O$ | H |
| 89 | $(CH_2)_3$ | 4-(2-naphthyl-$CH_2CH_2$-O) | H |
| 90 | $(CH_2)_3$ | 3-$CH_3O$ | H |
| 91 | $(CH_2)_4$ | 4-$C_2H_5O(CH_2)_3$ | H |
| 92 | $(CH_2)_2$ | 3-(4-Cl$C_6H_5OCH_2CH_2$) | H |
| 93 | $(CH_2)_5$ | 4-[(2-naphthyl)-O-$(CH_2)_2$] | H |
| 94 | $(CH_2)_3$ | 4-$C_6H_5\overset{\mid}{N}CH_2CH_2C_6H_5$ | H |
| 95 | $(CH_2)_4$ | 4-$C_6H_5\overset{\mid}{N}COC_6H_5$ | H |
| 96 | $(CH_2)_2$ | 2-naphthyl-N$CH_3$ | H |
| 97 | $(CH_2)_3$ | 4-(4-$C_5H_4N$)N$CH_3$ | H |
| 98 | $(CH_2)_3$ | 4-(1-methyl-3-piperidyl)N$CH_3$ | H |
| 99 | $(CH_2)_3$ | 4-(1-acetyl-3-piperidyl)N$CH_3$ | H |
| 100 | $(CH_2)_3$ | 4-(1-phenethyl-3-piperidyl)N$CH_3$ | H |
| 101 | $(CH_2)_3$ | 4-(1-benzoyl-3-piperidyl)N$CH_3$ | H |

TABLE 4—Continued

| Example | Y | $R_1$ | $R_2$ |
|---|---|---|---|
| 102 | $(CH_2)_3$ | 4-$C_6H_5\overset{\mid}{N}CONH_2$ | H |
| 103 | $(CH_2)_3$ | 4-$C_6H_5\overset{\mid}{N}CONHCH_3$ | H |
| 104 | $(CH_2)_3$ | 4-$C_6H_5\overset{\mid}{N}CON(CH_3)_2$ | H |
| 105 | $(CH_2)_3$ | 4-$C_6H_5\overset{\mid}{N}COOC_2H_5$ | H |
| 106 | $(CH_2)_3$ | 4-(2-isoindolinyl) | H |
| 107 | $(CH_2)_3$ | 4-(1-pyrrolidyl) | H |
| 108 | $(CH_2)_3$ | 4-(1-piperidyl) | H |
| 109 | $(CH_2)_3$ | 4-(4-methyl-1-piperazinyl) | H |
| 110 | $(CH_2)_3$ | 4-(4-acetyl-1-piperazinyl) | H |
| 111 | $(CH_2)_3$ | 4-(4-phenyl-1-piperazinyl) | H |
| 112 | $(CH_2)_3$ | 4-(4-phenethyl-1-piperazinyl) | H |
| 113 | $(CH_2)_3$ | 4-(4-benzoyl-1-piperazinyl) | H |

EXAMPLE 114

N - benzoyl - N,N - bis - [3 - (4 - cyclohexylmethyl - 1-piperidyl)propyl]amine dihydrochloride [I: $R_1$ is 4-$CH_2C_6H_{11}$; $R_2$ is H; $R_3$ is $C_6H_5CO$; Y is $(CH_2)_3$; $n$ is 2]

In two separate runs, a mixture of 4.6 g. (0.01 mole) of N,N - bis - [3 - (4 - cyclohexylmethyl - 1 - piperidyl)propyl]amine, 1.76 g. (0.013 mole) of benzoyl chloride, 2 g. of triethylamine, and 50 ml. of benzene was heater under reflux for three hours, cooled, filtered, and the filtrate taken to dryness. The residual oils from the two runs were combined, taken into methanol and treated with excess ethanolic hydrogen chloride. The precipitate, which separated on standing and cooling, was collected and recrystallized from an isopropanol/acetone mixture giving 4.0 g. of N-benzoyl-N,N-bis-[3-(4-cyclohexylmethyl-1-piperidyl)propyl]amine dihydrochloride, M.P. 272.0–279.0° C. (corr.).

N - benzoyl - N,N - bis - [3 - (4 - cyclohexylmethyl - 1-piperidyl)propyl]amine reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride and the like, to give, respectively, the formate, acetate, isobutyrate, alpha-mercaptopropionate, malate (or acid malate), fumarate (or acid fumarate), succinate (or acid succinate) succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate, and boron trifluoride salts.

EXAMPLES 115–154

The following N-($R_3$)-N,N-bis-[(4-cyclohexylmethyl-1-piperidyl)-lower-alkyl]amines in Formula I ($R_1$ is 4-$CH_2C_6H_{11}$; $R_2$ is H; $n$ is 2) listed below in Table 5 were prepared using the procedure described above in Example 114 by reaction of an appropriate acid chloride with an appropriate N,N-bis-[(4-cyclohexylmethyl-1-piperidyl)-lower-alkyl]amine. All melting points are corrected.

TABLE 5

| Example | Y | $R_3$ | Base or Salt | M.P. (° C.) | Cryst. from— |
|---|---|---|---|---|---|
| 115 | $(CH_2)_6$ | $C_6H_5CO$ | Base | 41.2–42.6 | Acetone. |
| 116 | $(CH_2)_6$ | 2-$ClC_6H_4CO$ | 2HCl | 241.2–243.0 | Isopropanol/acetone. |
| 117 | $(CH_2)_6$ | 4-$ClC_6H_4CO$ | Base | 54.6–56.0 | Acetone. |
| 118 | $(CH_2)_6$ | 3,4-$Cl_2C_6H_3CO$ | 2HCl | 179.4–182.8 | Do. |
| 119 | $(CH_2)_6$ | 4-$CH_3OC_6H_4CO$ | 2HCl | 245.2–246.0 | Ethanol/acetone. |
| 120 | $(CH_2)_6$ | 4-$CH_3OC_6H_4CO$ | 2CHl | 202.4–206.2 | Do. |
| 121 | $(CH_2)_3$ | 3-$CF_3C_6H_4CO$ | 2HCl | 231-0–231.8 | Isopropanol. |
| 122 | $(CH_2)_6$ | 4-$CF_3C_6H_4CO$ | 2CHl | 195.4–198.0 | Acetone/ether. |
| 123 | $(CH_2)_6$ | $(CH_3)_2CHCO$ | 2HCl | 192.6–196.0 | Ethanol/acetone. |
| 124 | $(CH_2)_5$ | $CH_3(CH_2)_3CO$ | (*) | 185.0–187.4 | Methanol/acetone. |
| 125 | $(CH_2)_6$ | $CH_3(CH_2)_3CO$ | 2HCl | 181.0–185.0 | Acetone. |
| 126 | $(CH_2)_6$ | $(CH_3)_2CHCH_2CO$ | 2HCl | 180.4–184.8 | Acetone/ether. |
| 127 | $(CH_2)_7$ | $CH_3(CH_2)_3CO$ | (*) | 130.4–134.0 | Acetone. |
| 128 | $(CH_2)_6$ | $CH_3(CH_2)_4CO$ | 2HCl | 181.8–183.6 | Do. |
| 129 | $(CH_2)_6$ | $CH_3(CH_2)_5CO$ | 2HCl | 178.0–184.0 | Acetone/ethyl acetate. |
| 130 | $(CH_2)_7$ | $CH_3(CH_2)_5CO$ | 2HCl | 191.6–194.6 | Ethanol/ether. |
| 131 | $(CH_2)_3$ | $C_3H_5CO$ | 2HCl | 215.0–219.4 | Do. |
| 132 | $(CH_2)_3$ | $C_4H_7CO$ | 2HCl | 195.6–201.2 | Ethanol/acetone/ether. |
| 133 | $(CH_2)_3$ | $C_6H_{11}CO$ | 2HCl | 224–226.5 | Methanol/acetone. |
| 134 | $(CH_2)_6$ | $C_6H_{11}CO$ | 2HCl | 187.0–189.2 | Chloroform/ethyl acetate. |
| 135 | $(CH_2)_3$ | $C_6H_5OCH_2CO$ | Base | 59.2–63.4 | Acetone. |
| 136 | $(CH_2)_6$ | $C_6H_5OCH_2CO$ | Base | 55.2–56.4 | Do. |
| 137 | $(CH_2)_6$ | COCO | Base | 97.6–99.2 | Do. |
| 138 | $(CH_2)_6$ | $COCH_3CH_2CO$ | 4HCl | 258.0–261.0 | Methanol/acetone/ether. |
| 139 | $C(H_2)_3$ | $CH_3(CH_2)_3CO$ | 2HCl | 197.0–199.8 | Ethanol/acetone. |
| 140 | $(CH_2)_3$ | $C_6H_5CH=CHCO$ | Base | 104.8–106.2 | Acetone. |

TABLE 5—Continued

| Example | Y | R₃ | Base or Salt | M.P. (° C.) | Cryst. from— |
|---|---|---|---|---|---|
| 141 | (CH₂)₄ | C₆H₅CH=CHCO | 2HCl | 225.0-227.0 | Ethanol/acetone. |
| 142 | (CH₂)₅ | C₆H₅CH=CHCO | 2HCl | 198.0-201.0 | Ethanol/acetone/ether. |
| 143 | (CH₂)₆ | C₆H₅CH=CHCO | 2HCl | 237.0-240.0 | Methanol/acetone/ether. |
| 144 | (CH₂)₇ | C₆H₅CH=CHCO | 2HCl | 230-232 | Do. |
| 145 | (CH₂)₆ | 4-CH₃C₆H₄SO₂ | 2HCl | 188.0-189.2 | Acetone/ether. |
| 146 | (CH₂)₆ | 4-NO₂C₆H₄CO | 2HCl | 192.194.2 | Acetone. |
| 147 | (CH₂)₆ | 3,5-(NO₂)₂C₆H₃CO | 2HCl | 255.0-256.0 | Methanol/acetone. |
| 148 | (CH₂)₆ | 3-NO₂-4-ClC₆H₃CO | 2HCl | 176.8-178.8 | Acetone. |
| 149 | (CH₂)₆ | 3-Cl-6-HOC₆H₃CO | 2HCl | 186.4-187.2 | Methanol/ether. |
| 150 | (CH₂)₆ | Cl₂CHCO | (*) | 122.0-125.4 | Acetone/ether. |
| 151 | (CH₂)₆ | 2-HOC₆H₄CO | Base | 79.0-82.6 | Hexane. |
| 152 | (CH₂)₆ | 2-CH₃CO₂C₆H₄CO | (*) | 10.9-111.0 | Acetone. |
| 153 | (CH₂)₆ | 4-CH₃O-3-NO₂C₆H₃CO | Base | 94.0-95.8 | Hexane |
| 154 | (CH₂)₇ | CH₃(CH₂)₈CO | 2HCl | 197.0-198.4 | Acetone. |

* Bis-cyclohexanesulfamate salt.

EXAMPLE 155

N - acetyl - N,N - bis - [3 - (4 - cyclohexymethyl - 1-piperidyl)propyl]-amine dihydrochloride [I: $R_1$ is 4-$CH_2C_6H_{11}$; $R_2$ is H; $R_3$ is $CH_3CO$; Y is $(CH_2)_3$; n is 2]

A solution of 13.8 g. (0.03 mole) of N,N-bis-[3-(4-cyclohexylmethyl-1-piperidyl)propyl]amine, 4 g. (0.04 mole) of acetic anhydride, and 50 ml. of pyridine was allowed to stand overnight at room temperature and then warmed one hour on a steam bath. The mixture was taken to dryness in vacuo; the residual oil was dissolved in 100 ml. of benzene and the solution washed once with dilute potassium carbonate, several times with water, and taken to dryness. The residual oil was distilled in vacuo, the fraction boiling at 203–210° C./0.002 mm. ($n_D^{25}$=1.5062) being collected as product.

A small amount of the oil, converted to the hydrochloride salt and recrystallized from absolute ethanol, gave N-acetyl-N,N-bis-[3-(4-cyclohexylmethyl-1-piperidyl)propyl]amine dihydrochloride, M.P. 277.2–279.0° C. (corr.).

EXAMPLES 156–166

The following N-($R_3$)-N,N-bis-[(4-cyclohexylmethyl-1-piperidyl)-lower-alkyl]amines of Formula I [$R_1$ is 4-$CH_2C_6H_{11}$; $R_2$ is H; n is 2] listed below in Table 6 were prepared according to the procedure described above in Example 155 by reacting an appropriate acid anhydride with an appropriate N,N-bis-[(4-cyclohexylmethyl-1-piperidyl)-lower-alkyl]amine. All melting points are corrected.

TABLE 6

| Example | Y | R₃ | Base or Salt | M.P. (° C.) | Cryst. from— |
|---|---|---|---|---|---|
| 156 | (CH₂)₄ | CH₃CO | Base | 59.2-61.0 | Hexane. |
| 157 | (CH₂)₅ | CH₃CO | 2HCl | 258.8-262.8 | Ethanol/ether. |
| 158 | (CH₂)₆ | CH₃CO | 2HCl.H₂O | 245.8-247.6 | Do. |
| 159 | (CH₂)₇ | CH₃CO | 2HCl | 237.6-238.8 | Isopropanol/acetone. |
| 160 | (CH₂)₃ | CH₃CH₂CO | 2HCl | 235.2-237.4 | Ethanol/acetone/ether. |
| 161 | (CH₂)₄ | CH₃CH₂CO | 2HCl | 226.0-227.8 | Ethanol/acetone. |
| 162 | (CH₂)₆ | CH₃CH₂CO | 2HCl | 227.2-228.6 | Methanol/acetone. |
| 163 | (CH₂)₃ | CH₃(CH₂)₂CO | 2HCl | 203.6-206.4 | Ethanol/acetone. |
| 164 | (CH₂)₅ | CH₃(CH₂)₂CO | 2HCl | 226.0-231.0 | Chloroform/acetone. |
| 165 | (CH₂)₆ | CH₃(CH₂)₂CO | 2HCl | 201.8-203.2 | Methanol/acetone/ether. |
| 166 | (CH₂)₇ | CH₃(CH₂)₂CO | 2HCl | 206.8-207.4 | Acetone. |

EXAMPLE 167

N - (β - carboxypropionyl) - N,N - bis - [3 - (4 - cyclohexylmethyl-1-piperidyl)propyl]amine dihydrochloride [I: $R_1$ is 4-$CH_2C_6H_{11}$; $R_2$ is H; $R_3$ is $COCH_2CH_2COOH$; Y is $(CH_2)_3$; n is 2]

A mixture of 11.6 g. (0.025 mole) of N,N-bis-[3-(4-cyclohexylmethyl-1-piperidyl)propyl]amine and 2.65 g. (0.026 mole) of succinic anhydride in about 200 ml. of benzene was heated under reflux for three hours using a water separator and then taken to dryness. The residual gum was dissolved in acetone and reprecipitated by addition of hexane, the process being repeated three times, and the remaining gummy material was then dissolved in a small volume of ethanol and acidified by addition of excess ethanolic hydrogen chloride. Precipitation of the resulting salt by addition of ether and recrystallization of the precipitate from acetone/methanol gave 6.2 g. of N-(β-carboxypropionyl)-N,N-bis-[3-(4-cyclohexylmethyl-1-piperidyl)propyl]amine dihydrochloride, M.P. 239.0° C. (dec., corr.).

EXAMPLE 168

N - (β - carboxypropionyl) - N,N - bis - [6 - (4 - cyclohexylmethyl - 1 - piperidyl)hexyl]amine dihydrochloride [I: $R_1$ is 4-$CH_2C_6H_{11}$; $R_2$ is H; $R_3$ is $COCH_2CH_2COOH$; Y is $(CH_2)_6$; n is 2] was prepared from 16.29 g. (0.03 mole) of N,N-bis-[6-(4-cyclohexylmethyl-1-piperidyl)hexyl]amine and 3.6 g. (0.04 mole) of succinic anhydride in about 250 ml. of benzene using the manipulative procedure described above in Example 167. The product was isolated in the form of the hydrochloride salt and the latter recrystallized from ethanol/acetone to give 9.4 g. of N-(β-carboxypropionyl)-N,N-bis-[6-(4-cyclohexylmethyl-1-piperidyl)hexyl]amine dihydrochloride, M.P. 223.5–227.5° C. (corr.).

EXAMPLE 169

N - (2 -carboxycyclohexylcarbonyl) - N,N - bis - [6-(4-cyclohexylmethyl - 1 - piperidyl)hexyl]amine dihydrochloride [I: $R_1$ is 4-$CH_2C_6H_{11}$; $R_2$ is H; $R_3$ is 2-$HOOCC_6H_{10}CO$; Y is $(CH_2)_6$; n is 2] was prepared from 16.3 g. (0.03 mole) of N,N-bis-[6-(4-cyclohexylmethyl-1-piperidyl)hexyl]amine and 5.55 g. (0.036 mole) of 1,2-cyclohexanedicarboxylic anhydride in about 100 ml. of benzene using the manipulative procedure described above in Example 167. The product was isolated in the form of the dihydrochloride salt and the latter recrystallized from acetone to give 6.1 g. of N-(2-carboxycyclohexylcarbonyl) - N,N - bis - [6 - (4 - cyclohexylmethyl-1-piperidyl)hexyl]amine dihydrochloride, M.P. 235.0–235.5° C. (corr.).

EXAMPLE 170

N - (β-phenylpropionyl)-N,N-bis-[3-(4-cyclohexylmethyl-1-piperidyl)propyl]amine dihydrochloride [I: $R_1$ is 4-$CH_2C_6H_{11}$; $R_2$ is H; $R_3$ is $C_6H_5CH_2CH_2CO$; Y is $(CH_2)_3$; $n$ is 2]

N - cinnamoyl - N,N - bis - [3 - (4-cyclohexylmethyl-1-piperidyl)propyl]amine (12.6 g., 0.026 mole) was dissolved in about 200 ml. of absolute ethanol and reduced over 1.0 g. of palladium-on-charcoal catalyst under hydrogen at sixty pounds p.s.i. pressure. Reduction was complete in about two and a half hours, and the mixture was filtered from the catalyst, and the filtrate taken to dryness giving 11.4 g. of a pale yellow viscous oil. The latter was dissolved in 15 ml. of ether, and the solution treated with excess ethanolic hydrogen chloride. The solid which separated was collected, washed with ether and recrystallized from an ethanol/acetone mixture giving 8.9 g. of N-($\beta$-phenylpropionyl)-N,N-bis-[3-(4-cyclohexylmethyl-1-piperidyl)propyl]amine dihydrochloride, M.P. 257.5–259.0° C. (corr.).

EXAMPLE 171

N - ($\beta$ - phenylpropionyl) - N,N - bis-[6-(4-cyclohexylmethyl-1-piperidyl)hexyl] amine dihydrochloride [I: $R_1$ is 4-$CH_2C_6H_{11}$; $R_2$ is H; $R_3$ is $C_6H_5CH_2CH_2CO$; Y is $(CH_2)_6$; $n$ is 2] was prepared by catalytic reduction of 14.9 g. (0.02 mole) of N-cinnamoyl-N,N-bis-[6-(4-cyclohexylmethyl-1-piperidyl)hexyl]amine in 200 ml. of ethanol over 1 g. of palladium-on-charcoal catalyst using the manipulative procedure described above in Example 170. The crude product, converted to the dihydrochloride salt, was recrystallized from an ethanol/acetone mixture giving 9.1 g. of N-($\beta$-phenylpropionyl)-N,N - bis-[6-(4-cyclohexylmethyl-1-piperidyl)hexyl]amine dihydrochloride, M.P. 185.8–187.6° C. (corr.).

EXAMPLE 172

N - ($\beta$ - cyclohexylpropionyl) - N,N-bis-[3-(4-cyclohexylmethyl-1-piperidyl)propyl]amine dihydrochloride [I: $R_1$ is 4-$CH_2C_6H_{11}$; $R_2$ is H; $R_3$ is $C_6H_{11}CH_2CH_2CO$; Y is $(CH_2)_3$; $n$ is 2]

N - cinnamoyl - N,N - bis - [3 - (4-cyclohexylmethyl-1-piperidyl)propyl]amine (9.9 g., 0.015 mole), dissolved in 200 ml. of absolute ethanol, was reduced over 1.0 g. of platinum oxide catalyst under hydrogen at a pressure of about 60 pounds p.s.i. and 60° C. Reduction was completed in about eight hours, and the reaction mixture was filtered from the catalyst, the filtrate diluted with 250 ml. of acetone and cooled. The solid which separated was collected, washed with ether and recrystallized from an ethanol/acetone mixture giving 9.3 g. of N-($\beta$-cyclohexylpropionyl) - N,N - bis-[3-(4-cyclohexylmethyl-1-piperidyl)propyl]amine dihydrochloride, M.P. 236–240° C. (corr.).

EXAMPLES 173–176

The following N-($\beta$-cyclohexylpropionyl)-N,N-bis-[(4-cyclohexylmethyl-1-piperidyl)-lower-alkyl]amines of Formula I ($R_1$ is 4-$CH_2C_6H_{11}$; $R_2$ is H; $R_3$ is $C_6H_{11}CH_2CH_2CO$; $n$ is 2) listed below in Table 7 were prepared by reducing over platinum oxide the corresponding N-cinnamoyl-N,N-bis-[(4-cyclohexylmethyl-1-piperidyl)-lower-alkyl]amines using the manipulative procedure described above in Example 172.

TABLE 7

| Example | Y | Base or Salt | M.P. (° C.) | Cryst. from— |
|---|---|---|---|---|
| 173 | $(CH_2)_4$ | 2HCl | 229.5–231.0 | Acetone/ethyl acetate. |
| 174 | $(CH_2)_5$ | 2HCl | 211.0–214.0 | Ethanol/acetone. |
| 175 | $(CH_2)_6$ | 2HCl | 182 2–184.0 | Ethanol/acetone/ether. |
| 176 | $(CH_2)_7$ | 2HCl | 195–197 | Ethanol/ether. |

EXAMPLE 177

N - ($\alpha,\alpha,\gamma$ - trimethyl-$\beta$-oxovaleroyl)-N,N-bis-[6-(4-cyclohexylmethyl-1-piperidyl)hexyl]amine dihydrochloride [I: $R_1$ is 4-$CH_2C_6H_{11}$; $R_2$ is H; $R_3$ is $(CH_3)_2CHCOC(CH_3)_2CO$ Y is $(CH_2)_6$; $n$ is 2]

A mixture of 10.5 g. (0.02 mole) of N,N-bis-[6-(4-cyclohexylmethyl-1-piperidyl)hexyl]amine and 50 ml. of $\alpha,\alpha$-dimethyl-$\beta$-isopropylidenylbutyrolactone was heated on a steam bath for seven hours. The mixture was then taken to dryness in vacuo, the residue dissolved in ethanol and the solution acidified with ethanolic hydrogen chloride and diluted with ether. Several recrystallizations from acetone of the solid which separated afforded 5.5 g. of N-($\alpha,\alpha,\gamma$-trimethyl-$\beta$-oxovaleroyl)-N,N-bis-[6-(4 - cyclohexylmethyl - 1-piperidyl)hexyl]amine dihydrochloride, M.P. 211.0–214° C. (corr.).

EXAMPLE 178

N - (2 - aminobenzoyl) - N,N-bis-[3-(4-cyclohexylmethyl-1-piperidyl)propyl]amine trihydrochloride [I: $R_1$ is 4-$CH_2C_6H_{11}$; $R_2$ is H; $R_3$ is 2-$NH_2C_6H_4CO$; Y is $(CH_2)_3$; $n$ is 2]

A mixture of 11.6 g. (0.02 mole) of N,N-bis-[3-(4-cyclohexylmethyl-1-piperidyl)propyl]amine and 4.4 g. (0.03 mole) is isatoic anhydride in about 100 ml. of benzene was heated under reflux for three hours and then taken to dryness. The residue was dissolved in 200 ml. of methanol, cooled overnight in a cold room, and the solid material which separated was collected to give 6.1 g. of N-(2-carboxyphenylaminocarbonyl)-N, N-bis-[3-(4-cyclohexylmethyl-1-piperidyl)propyl]amine as a by-product. Concentration of the filtrate to a small volume and further cooling afforded a second crop of 1.0 g. of the same by-product.

The filtrate obtained after collection of the above-named by-product was concentrated to a small volume, acidified with 6.0 ml. of 7.33 N ethanolic hydrogen chloride, diluted strongly with ether, and the hydrochloride salt which separated was collected and dried to give 7.2 g. of crude material.

The latter was dissolved in chloroform and reconverted to the free base by washing with dilute sodium carbonate and water and drying the chloroform solution containing the free base over anhydrous calcium sulfate. The solution was then rendered 2% in isopropylamine by addition of 6.0 ml. of the latter and treated three times with stirring for fifteen minutes with 5.0, 10.0, and 15.0 g. batches of silica gel, filtering the solution each time from the adsorbent.

The solution was then taken to dryness once again, the residue was dissolved in absolute ethanol, and the solution acidified with excess ethanolic hydrogen chloride. Dilution of the solution with acetone and ether caused the separation of a solid material which was collected and recrystallized from isopropanol/acetone to give 3.4 g. of N-(2-aminobenzoyl)-N,N-bis-[3-(4-cyclohexylmethyl - 1-piperidyl)propyl]amine trihydrochloride, M.P. 240.0 260.0° C. (indef., corr.).

EXAMPLE 179

N-(4-aminobenzoyl)-N,N-bis - [6 - (4 - cyclohexylmethyl-1-piperidyl)hexyl]amine dihydrochloride [I: $R_1$ is 4-$CH_2C_6H_{11}$; $R_2$ is H; $R_3$ is 4-$NH_2C_6H_4CO$; Y is $(CH_2)_6$; $n$ is 2]

N-(4-nitrobenzoyl)-N,N-bis-[6 - (4 - cyclohexylmethyl-1-piperidyl)hexyl]amine dihydrochloride (10.8 g., 0.014 mole) was dissolved in 250 ml. of absolute ethanol and reduced over 0.2 g. of platinum oxide catalyst under an initial hydrogen pressure of 60 pounds p.s.i. at room temperature. After an uptake of the theoretical amount of hydrogen, the catalyst was removed by filtration, and the filtrate evaporated to a volume of about 50 ml. The solid which separated on cooling was collected and dried giving 3.2 g. of N-(4-aminobenzoyl)N,N-bis-[6-(4-cyclohexylmethyl-1-piperidyl)hexyl]amine dihydrochloride, M.P. 241.6–243.0° C. (corr.).

EXAMPLE 180

N-(3,5-diaminobenzoyl)-N,N-bis-[6-(4 - cyclohexylmethyl-1-piperidyl)hexyl]amine dihydrochloride [I: $R_1$ is 4-$CH_2C_6H_{11}$; $R_2$ is H; $R_3$ is 3,5-$(NH_2)_2C_6H_3CO$; Y is $(CH_2)_6$; $n$ is 2]

N-(3,5-dinitrobenzoyl)-N,N - bis - [6 - (4 - cyclohexylmethyl-1-piperidyl)hexyl]amine dihydrochloride (19.1 g., 0.024 mole) was dissolved in 250 ml. of ethanol and reduced over 0.6 g. of platinum oxide catalyst under an initial hydrogen pressure of 60 pounds p.s.i. and at a temperature of from 28 to 42° C. After a total uptake of the theoretical amount of hydrogen, the catalyst was removed by filtration, and the filtrate evaporated to a small volume and cooled. The solid which separated was collected and dried giving 5.5 g. of N-(3,5-diaminobenzoyl)-N,N-bis-[6-(4-cyclohexylmethyl-1-piperidyl)hexyl]amine dihydrochloride, M.P. 250.0–252.0° C.

EXAMPLE 181

N-(3-amino-4-chlorobenzoyl)-N,N-bis-[6-(4 - cyclohexylmethyl - 1 - piperidyl)hexyl]amine dihydrochloride [I: $R_1$ is 4-$CH_2C_6H_{11}$; $R_2$ is H; $R_3$ is 3-$NH_2$-4-$ClC_6H_3CO$; Y is $(CH_2)_6$; $n$ is 2]

N-(3-nitro-4-chlorobenzoyl)-N,N - bis - [6 - (4 - cyclohexylmethyl - 1 - piperidyl)hexyl]amine dihydrochloride (21.7 g., 0.03 mole) was dissolved in 250 ml. of absolute ethanol and reduced over 0.6 g. of a platinum oxide catalyst at an initial hydrogen pressure of 60 pounds p.s.i. at room temperature. After a total uptake of the theoretical amount of hydrogen, the catalyst was removed by filtration, and the filtrate taken to dryness. The residue was recrystallized several times from a methanol/acetone/ether mixture and once from acetone alone giving 3.4 g. of N-(3-amino-4-chlorobenzoyl)-N,N-bis - [6 - (4 - cyclohexylmethyl - 1 - piperidyl)hexyl]amine dihydrochloride, M.P. 205.4–207.6° C. (corr.).

EXAMPLE 182

N-(4-acetylaminobenzoyl)-N,N-bis - [6 - (4 - cyclohexylmethyl - 1 - piperidyl)hexyl]amine dihydrochloride [I: $R_1$ is 4-$CH_2C_6H_{11}$; $R_2$ is H; $R_3$ is 4-$CH_3CONHC_6H_4CO$; Y is $(CH_2)_6$; $n$ is 2]

A suspension of 8.4 g. (0.01 mole) of N-(4-aminobenzoyl)-N,N-bis-[6-(4-cyclohexylmethyl - 1 - piperidyl)-hexyl]amine dihydrochloride in about 120 ml. of pyridine was treated with 2.65 g. (0.026 mole) of acetic anhydride and warmed on a steam bath for about three hours. The reaction mixture was taken to dryness, the residue extracted with boiling acetone and the combined acetone extracts evaporated to a volume of about 50 ml. The solid which separated was recrystallized once from methanol/ether and once from acetone/methanol to give 5.4 g. of N-(4-acetylaminobenzoyl)-N,N-bis - [6 - (4 - cyclohexylmethyl - 1 - piperidyl)hexyl]amine dihydrochloride, M.P. 185.0–189.0° C. (corr.).

EXAMPLE 183

N - (3,5 - diacetylaminobenzoyl) - N,N - bis - [6 - (4-cylohexylmethyl - 1 - piperidyl)hexyl]amine dihydrochloride [I: $R_1$ is 4-$CH_2C_6H_{11}$; $R_2$ is H; $R_3$ is 3,5-$(CH_2CONH)_2C_6H_3CO$; Y is $(CH_2)_6$; $n$ is 2]

A mixture of 9.7 g. (0.013 mole) of N-(3,5-diaminobenzoyl)-N,N-bis-[6-(4-cyclohexylmethyl - 1 - piperidyl)-hexyl]amine dihydrochloride and 5.01 g. (0.05 mole) of acetic anhydride in about 200 ml. of pyridine was heated on a steam bath for one hour, and then taken to dryness in vacuo. The residue was extracted with methanol/acetone and the combined extracts concentrated to a volume of about 200 ml. and diluted with ether. The solid which separated was recrystallized from an isopropanol/acetone mixture giving 3.9 g. of N-(3,5-diacetylaminobenzoyl)-N,N - bis - [6 - (4 - cyclohexylmethyl-1-piperidyl)hexyl] amine dihydrochloride, M.P. 225.0–226.0° C. (corr.).

EXAMPLE 184

N-[7-(4-cyclohexylmethyl - 1 - piperidyl)heptanoyl]-N,N-bis-[7-(4-cyclohexylmethyl - 1 - piperidyl)heptyl]amine trihydrochloride [I: $R_1$ is 4-$C_6H_{11}CH_2$; $R_2$ is H; $R_3$ is (4-cyclohexylmethyl - 1 - piperidyl)-$(CH_2)_6CO$; Y is $(CH_2)_7$; $n$ is 2]

To a solution of 1.66 g. (0.017 mole) of triethylamine, 2.25 g. (0.017 mole) of isobutyl chloroformate, and 4.63 g. (0.015 mole) of 7-(4-cyclohexylmethyl-1-piperidyl)heptanoic acid in 250 ml. of acetone was added a solution of 8.6 g. (0.015 mole) of N,N-bis-[7-(4-cyclohexylmethyl-1-piperidyl)heptyl]amine in 50 ml. of acetone and 50 ml. of tetrahydrofuran while maintaining the temperature at −5 to −10° C. The mixture was stirred in an ice bath for a half hour and then at room temperature for five hours, filtered and the filtrate taken to dryness. The residual gum was taken into benzene and extracted first with aqueous sodium carbonate and then with water, and the organic layer was dried and taken to dryness. The residual gum was dissolved in a small volume of ethanol, treated with 4.3 ml. of 9.7 N ethanolic hydrogen chloride and diluted with about 400 ml. of ether. Recrystallization of the resulting precipitate from ethanol-acetone gave 5.8 g. of N-[7-(4-cyclohexylmethyl-1-piperidyl)heptanoyl] - N,N - bis - [7-(4-cyclohexylmethyl-1-piperidyl)heptyl]amine trihydrochloride, M.P. 270.0–276.0° C. (corr.).

EXAMPLES 185–228

By following the manipulative procedure described above in Example 155, substituting for the N,N-bis-[3-(4-cyclohexylmethyl-1-piperidyl)propyl]amine used therein, a molar equivalent amount of an appropriate N,N-bis-[(substituted-1-piperidyl)-lower-alkyl]amine, there can be obtained the N-acetyl-N,N-bis-[(substituted-1-piperidyl)-lower-alkyl]amines of Formula I ($R_3$ is $CH_3CO$; $n$ is 2) listed below in Table 8.

TABLE 8

| Example | Y | $R_1$ | $R_2$ |
|---|---|---|---|
| 185 | $(CH_2)_3$ | 4-$CONHC_2H_5$ | H |
| 186 | $(CH_2)_3$ | 4-$CON(CH_3)_2$ | H |
| 187 | $(CH_2)_3$ | 4-$CH_2C_6H_5$ | H |
| 188 | $(CH_2)_3$ | 4-$(CH_3)_2CH$ | H |
| 189 | $(CH_2)_3$ | 4-$CH_2OH$ | H |
| 190 | $(CH_2)_2$ | 4-HO | 2,6-$(CH_3)_2$ |
| 191 | $(CH_2)_5$ | 4-HO | 2,2,4,6,6-$(CH_3)_5$ |
| 192 | $(CH_2)_3$ | 4-HO | 2,2-$(CH_3)_2$-6-$(CH_3)_2CHCH_2$ |
| 193 | $(CH_2)_3$ | 4-$(CH_2)_6OH$ | H |
| 194 | $(CH_2)_3$ | 4-NHCHO | H |
| 195 | $(CH_2)_3$ | 4-$NHCOCH(C_2H_5)CH_2CH_3$ | H |
| 196 | $(CH_2)_3$ | 3-$CONHCH_2CH_2CH_2CH_3$ | H |
| 197 | $(CH_2)_3$ | 4-$CONC_5H_{10}$ | H |
| 198 | $(CH_2)_3$ | 4-$CONC_4H_8$ | H |
| 199 | $(CH_2)_3$ | 4-$C_6H_5O$ | H |
| 200 | $(CH_2)_3$ | 4-(2-naphthyl-O-) | H |
| 201 | $(CH_2)_3$ | 4-$C_6H_5CH_2CH_2O$ | H |
| 202 | $(CH_2)_3$ | 4-(2-naphthyl-$CH_2CH_2$-O-) | H |

TABLE 8—Continued.

| Example | Y | R₁ | R₂ |
|---|---|---|---|
| 203 | (CH₂)₃ | 3-CH₃O | H |
| 204 | (CH₂)₄ | 4-C₂H₅O(CH₂)₃ | H |
| 205 | (CH₂)₂ | 3-(4-ClC₆H₄OCH₂CH₂) | H |
| 206 | (CH₂)₅ | 4-[(2-naphthyl)-O-(CH₂)₂] | H |
| 207 | (CH₂)₃ | 4-C₆H₅NCH₃ | H |
| 208 | (CH₂)₃ | 4-C₆H₅NCOCH₃ | H |
| 209 | (CH₂)₃ | 4-C₆H₅NCH₂CH₂C₆H₅ | H |
| 210 | (CH₂)₄ | 4-C₆H₅NCOC₆H₅ | H |
| 211 | (CH₂)₂ | 2-naphthyl-NCH₃ | H |
| 212 | (CH₂)₃ | 4-(4-C₅H₄N)NCH₃ | H |
| 213 | (CH₂)₃ | 4-(1-methyl-3-piperidyl)NCH₃ | H |
| 214 | (CH₂)₃ | 4-(1-acetyl-3-piperidyl)NCH₃ | H |
| 215 | (CH₂)₃ | 4-(1-phenethyl-3-piperidyl)NCH₃ | H |
| 216 | (CH₂)₃ | 4-(1-benzoyl-3-piperidyl)NCH₃ | H |
| 217 | (CH₂)₃ | 4-C₆H₅NCONH₂ | H |
| 218 | (CH₂)₃ | 4-C₆H₅NCONHCH₃ | H |
| 219 | (CH₂)₃ | 4-C₆H₅NCON(CH₃)₂ | H |
| 220 | (CH₂)₃ | 4-C₆H₅NCOOC₂H₅ | H |
| 221 | (CH₂)₃ | 4-(2-isoindolinyl) | H |
| 222 | (CH₂)₃ | 4-(1-pyrrolidyl) | H |
| 223 | (CH₂)₃ | 4-(1-piperidyl) | H |
| 224 | (CH₂)₃ | 4-(4-methyl-1-piperazinyl) | H |
| 225 | (CH₂)₃ | 4-(4acetyl-1-piperazinyl) | H |
| 226 | (CH₂)₃ | 4-(4-phenyl-1-piperazinyl) | H |
| 227 | (CH₂)₃ | 4-(4-phenethyl-1-piperazinyl) | H |
| 228 | (CH₂)₃ | 4-(4-benzoyl-1-piperazinyl) | H |

Our new (1-piperidyl)-lower-alkylamines of Formula I showed anti-inflammatory activity in one or more of three different test procedures, viz, inhibition of granuloma pouch formation in rats, inhibition of dextran-induced local foot edema in rats, and inhibition of para-influenza (Sendai strain) virus-induced lung inflammation in mice. Data obtained for representative compounds of the series are given in Table 9 which follows. The activities are given in terms of the minimum dose (MIND) which is defined as the smallest dose, expressed in milligrams per kilogram of body weight, producing 30% inhibition of the inflammation in the lung inflammation and dextran edema tests and 40% inhibition in the granuloma pouch test. The symbols G.P., L.I., and D.E. represent the tests named above, namely the granuloma pouch, lung inflammation, and dextran edema tests, respectively, while the designations s.c. and p.o. represent subcutaneous and peroral routes of administration, respectively.

TABLE 9

| Example | G.P. | L.I. | D.E. |
|---|---|---|---|
| 114 | 0.10 (s.c.), 6.25 (p.o.) | 6.25 (s.c.) | |
| 115 | 0.40 (s.c.) | 6.25 (s.c.) | |
| 116 | | 156 (s.c.) | |
| 117 | 0.40 (s.c.) | 6.25 (s.c.), 25 (p.o.) | |
| 119 | | 6.25 (s.c.) | |
| 120 | | 6.25 (s.c.) | |
| 121 | | 6.25 (s.c.) | |
| 122 | | 1.56 (s.c.) | |
| 125 | 100 (p.o.) | 6.25 (s.c.), 100 (p.o.) | |
| 128 | 100 (p.o.) | | |
| 130 | 100 (p.o.) | 6.25 (s.c.) | |
| 132 | | 6.25 (s.c.) | |
| 135 | | 100 (p.o.) | |
| 136 | 0.40 (s.c.) | | |
| 137 | 0.40 (s.c.) | 6.25 (s.c.) | |
| 138 | | 25 (s.c.) | |
| 140 | 0.10 (s.c.) | 1.56 (s.c.) | |
| 141 | 100 (p.o.) | 6.25 (s.c.) | |
| 142 | 100 (p.o.) | | |
| 144 | | 6.25 (s.c.) | |
| 145 | | 6.25 (s.c.) | |
| 155 | 0.4 (s.c.) | 100 (p.o.) | 100 (p.o.) |
| 156 | 6.25 (s.c.) | 100 (s.c.) | |
| 157 | | 25 (s.c.) | |
| 158 | 1.56 (s.c.) | 6.25 (s.c.) | |
| 159 | | 25 (s.c.) | |
| 161 | 6.25 (s.c.) | 25 (s.c.) | |
| 162 | | 6.25 (s.c.), 100 (p.o.) | |
| 164 | | 25 (s.c.) | |
| 165 | | 25 (s.c.) | |
| 168 | | 25 (s.c.) | |
| 170 | | 6.25 (s.c.) | |
| 172 | 25 (s.c.), 100 (p.o.) | 25 (s.c.) | |
| 175 | 100 (p.o.) | | |

The compounds of Formula I have also been shown to possess coronary dilator activity when tested in the isolated rabbit heart. Coronary dilator activity data so-obtained for representative compounds of the series are given in Table 10 below. The activities are expressed either in terms of the Effective Dose (ED₅₀) or in terms of the percent dilatation, at a given dose level, the doses in both cases being expressed in terms of the dose per heart.

TABLE 10

| Example: | Activity |
|---|---|
| 119 | ED₅₀=6.1 mcg.; 2328% of papaverine. |
| 120 | 25% dilatation at 50 mg. |
| 132 | 23% dilatation at 50 mg. |

The compounds of Formula I have also been shown to have psychomotor depressant activity as determined in mice using standard activity cages. Psychomotor depressant activity data so-obtained for representative compounds of the series are given below in Table 11. The data are given in terms of the percentage decrease in the animals' activity at a particular dose level.

TABLE 11

| Example: | Activity |
|---|---|
| 119 | 59% decrease at 300 mg./kg. (p.o.). |
| 120 | 76% decrease at 16 mg./kg. (p.o.). |

The compounds of Formula I have also been shown to possess anthelmintic acivity when administered orally to Swiss mice infected by the tapeworm, *Hymenolepis nana*, and the pinworm, *Aspicularis tetraptera*. Data so-obtained with representative compounds are given below in Table 12 and are expressed in terms of the dose, in mg./kg./day administered two times a day for four days, required to clear all the animals in the test group of each of the test organisms.

TABLE 12

| Example: | Dose (mg./kg./day) Hy. nana | Asp. tetratera |
|---|---|---|
| 118 | 200 | 200 |
| 121 | 400 | |
| 124 | 400 | 400 |
| 130 | | 400 |
| 134 | 400 | 200 |
| 140 | 100 | 100 |
| 142 | 200 | 200 |
| 143 | 200 | 100 |
| 144 | 400 | |
| 145 | 400 | |
| 147 | 200 | 200 |
| 148 | 200 | 400 |
| 149 | 200 | |
| 150 | 400 | 400 |
| 169 | 200 | 200 |
| 170 | 200 | |
| 171 | 200 | |
| 172 | 400 | |
| 174 | | 400 |

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds cn be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

We claim:
1. A compound of the formula

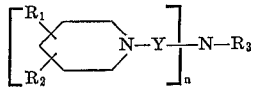

wherein $R_1$ is unsubstituted-carbamyl, N-lower-alkylcarbamyl, N,N-di-lower-alkylcarbamyl, piperidinocarbonyl, pyrrolidino-carbonyl, hydroxy, lower-alkoxy, phenoxy, naphthoxy, phenyl-lower-alkoxy, naphthyl-lower-alkoxy, hydroxy-lower-alkyl, lower-alkoxy-lower-alkyl, phenoxy-lower-alkyl, naphthoxy-lower-alkyl, lower-alkanoylamino, phenyl-lower-alkyl, cycloalkyl-lower-alkyl having 3 to 7 ring carbon atoms, or the group

where $R_4$ is phenyl, naphthyl, pyridyl, 3- or 4-piperidyl substituted on the nitrogen atom by lower-alkyl, lower-alkanoyl, phenyl-lower-alkyl, or benzoyl; $R_5$ is lower-alkyl, lower-alkanoyl, phenyl-lower-alkyl, benzoyl, carbamyl, N-lower-alkylcarbamyl, N,N-di-lower-alkylcarbamyl, or carbo-lower-alkoxy, $R_4$ and $R_5$ taken together with the nitrogen atom to which they are attached form a heterocyclic ring selected from the group consisting of isoindolinyl, pyrrolidyl, piperidyl, or piperazinyl substituted on the 4-nitrogen atom by lower-alkyl, lower-alkanoyl, phenyl, phenyl-lower-alkyl, or benzoyl; $R_2$ is hydrogen or from one to five lower-alkyls; $R_3$ is benzoyl, phenyl-lower-alkanoyl, lower-alkanoyl, halo-lower-alkanoyl, cycloalkanecarbonyl having 3 to 7 ring carbon atoms, cycloalkyl-lower-alkanoyl having 3 to 7 ring carbon atoms, carboxy-cycloalkylcarbonyl having 3 to 7 ring carbon atoms, phenoxy-lower-alkanoyl, phenyl-lower alkenoyl, carboxy-lower-alkanoyl, phenylsulphonyl, ω-(1-piperidyl)-lower-alkanoyl, lower-alkyl-keto-lower-alkanoyl, or

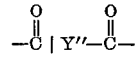

where $Y''$ is a single bond or lower-alkylene containing from one to four carbon atoms, joining two of the (1-piperidyl)-lower-alkylamino radicals together; $Y$ is lower-alkylene; and $n$ is one of the integers 1 and 2, the third valence on the amino nitrogen atom being taken up by a hydrogen atom when $n$ is 1.

2. A compound according to claim 1 wherein $R_1$ is cycloalkyl-lower-alkyl having 3 to 7 ring carbon atoms; $R_2$ is hydrogen; $R_3$ is benzoyl; and $n$ is 2.

3. A compound according to claim 1 wherein $R_1$ is cycloalkyl-lower-alkyl having 3 to 7 ring carbon atoms; $R_2$ is hydrogen; $R_3$ is lower-alkanoyl; and $n$ is 2.

4. A compound according to claim 1 wherein $R_1$ is cycloalkyl-lower-alkyl having 3 to 7 ring carbon atoms; $R_2$ is hydrogen; $R_3$ is halo-lower-alkanoyl; and $n$ is 2.

5. A compound according to claim 1 wherein $R_1$ is cycloalkyl-lower-alkyl having 3 to 7 ring carbon atoms; $R_2$ is hydrogen; $R_3$ is cycloalkanecarbonyl; and $n$ is 2.

6. A compound according to claim 1 wherein $R_1$ is cycloalkyl-lower-alkyl having 3 to 7 ring carbon atoms; $R_2$ is hydrogen; $R_3$ is cycloalkyl-lower-alkanoyl; and $n$ is 2.

7. A compound according to claim 1 wherein $R_1$ is cycloalkyl-lower-alkyl having 3 to 7 ring carbon atoms; $R_2$ is hydrogen; $R_3$ is carboxy-cycloalkylcarbonyl; and $n$ is 2.

8. A compound according to claim 1 wherein $R_1$ is cycloalkyl-lower-alkyl having 3 to 7 ring carbon atoms; $R_2$ is hydrogen; $R_3$ is phenyl-lower-alkenoyl; and $n$ is 2.

9. A compound according to claim 1 wherein $R_1$ is cycloalkyl-lower-alkyl having 3 to 7 ring carbon atoms; $R_2$ is hydrogen; $R_3$ is carboxy-lower-alkanoyl; and $n$ is 2.

10. A compound according to claim 1 wherein $R_1$ is cycloalkyl-lower-alkyl having 3 to 7 ring carbon atoms; $R_2$ is hydrogen; $R_3$ is phenylsulfonyl; and $n$ is 2.

11. A compound according to claim 1 wherein $R_1$ is cycloalkyl-lower-alkyl having 3 to 7 ring carbon atoms; $R_2$ is hydrogen; $R_3$ is lower-alkyl-keto-lower-alkanoyl; and $n$ is 2.

12. N-(4-methoxybenzoyl)N,N - bis-[6-(4-cyclohexylmethyl-1-piperidyl)hexyl]amine according to claim 2 wherein $R_1$ is 4-cyclohexylmethyl; $R_3$ as benzoyl bears a 4-methoxy substituent; and $Y$ is 1,6-hexylene.

13. N-(2-aminobenzoyl)-N,N - bis - [3-(4-cyclohexylmethyl-1-piperidyl)propyl]amine according to claim 2 wherein $R_1$ is 4-cyclohexylmethyl; $R_3$ as benzoyl bears a 2-amino substituent; and $Y$ is 1,3-propylene.

14. N-(2-acetoxybenzoyl)-N,N - bis-[6-(4-cyclohexylmethyl-1-piperidyl)hexyl]amine according to claim 2 wherein $R_1$ is 4-cyclohexylmethyl; $R_3$ as benzoyl bears a 2-acetoxy substituent; and $Y$ is 1,6-hexylene.

15. N-(2-hydroxybenzoyl)-N,N - bis-[6-(4-cyclohexylmethyl-1-piperidyl)hexyl]amine according to claim 2 wherein $R_1$ is 4-cyclohexylmethyl; $R_3$ as benzoyl bears a 2-hydroxy substituent; and $Y$ is 1,6-hexylene.

16. N-(2-hydroxy-5-chlorobenzoyl) - N,N - bis-[6-(4-cyclohexylmethyl-1-piperidyl)hexyl]amine according to claim 2 wherein $R_1$ is 4-cyclohexylmethyl; $R_3$ as benzoyl bears a 2-hydroxy and a 5-chloro substituent; and $Y$ is 1,6-hexylene.

17. N-(3-nitro-4-chlorobenzoyl)-N,N - bis-[6-(4-cyclohexylmethyl-1-piperidyl)hexyl]amine according to claim 2 wherein $R_1$ is 4-cyclohexylmethyl; $R_3$ as benzoyl bears a 3-nitro and 4-chloro substituent; and $Y$ is 1,6-hexylene.

18. N-(3-trifluoromethylbenzoyl) - N,N - bis-[3-(4-cyclohexylmethyl - 1 - piperidyl)propyl]amine according to claim 2 wherein $R_1$ is 4-cyclohexylmethyl; $R_3$ as benzoyl bears a 3-trifluoromethyl substituent; and $Y$ is 1,3-propylene.

19. N-(4-methoxybenzoyl)-N,N - bis-[3-(4-cyclohexylmethyl-1-piperidyl)propyl]amine according to claim 2 wherein $R_1$ is 4-cyclohexylmethyl; $R_3$ as benzoyl bears a 4-methoxy substituent; and Y is 1,3-propylene.

20. N-(3,4-dichlorobenzoyl) - N,N - bis - [6-(4-cyclohexylmethyl-1-piperidyl)hexyl]amine according to claim 2 wherein $R_1$ is 4-cyclohexylmethyl; $R_3$ as benzoyl bears 3,4-dichloro substituents; and Y is 1,6-hexylene.

21. N-benzoyl - N,N - bis - [6-(4-cyclohexylmethyl-1-piperidyl)hexyl]amine according to claim 2 wherein $R_1$ is 4-cyclohexylmethyl; $R_3$ as benzoyl is unsubstituted; and Y is 1,6-hexylene.

22. N-heptanoyl - N,N - bis-[7-(4-cyclohexylmethyl-1-piperidyl)heptyl]amine according to claim 3 wherein $R_1$ is 4-cyclohexylmethyl; $R_3$ is heptanoyl; and Y is 1,7-heptyl.

23. N-valeroyl-N,N - bis - [7-(4-cyclohexylmethyl-1-piperidyl)heptyl]amine according to claim 3 wherein $R_1$ is 4-cyclohexylmethyl; $R_3$ is valeroyl; and Y is 1,7-heptyl.

24. N-valeroyl - N,N - bis - [5-(4-cyclohexylmethyl-1-piperidyl)pentyl]amine according to claim 3 wherein $R_1$ is 4-cyclohexylmethyl; $R_3$ is valeroyl; and Y is 1,5-pentylene.

25. N-isobutyroyl-N,N - bis-[6-(4-cyclohexylmethyl-1-piperidyl)hexyl]amine according to claim 3 wherein $R_1$ is 4-cyclohexylmethyl; $R_3$ is isobutyroyl; and Y is 1,6-hexylene.

26. N-dichloroacetyl-N,N - bis-[6-(4-cyclohexylmethyl-1-piperidyl)hexyl]amine according to claim 4 wherein $R_1$ is 4-cyclohexylmethyl; $R_3$ is dichloroacetyl; and Y is 1,6-hexylene.

27. N-cyclohexylcarbonyl - N,N - bis-[6-(4-cyclohexylmethyl-1-piperidyl)hexyl]amine according to claim 5 wherein $R_1$ is 4-cyclohexylmethyl; $R_3$ is cyclohexylcarbonyl; and Y is 1,6-hexylene.

28. N-cyclohexylcarbonyl-N,N - bis-[3-(4-cyclohexylmethyl-1-piperidyl)propyl]amine according to claim 5 wherein $R_1$ is 4-cyclohexylmethyl; $R_3$ is cyclohexylcarbonyl; and Y is 1,3-propylene.

29. N-(β-cyclohexylpropionyl) - N,N - bis-[7-(4-cyclohexylmethyl-1-piperidyl)heptyl]amine according to claim 6 wherein $R_1$ is 4-cyclohexylmethyl; $R_3$ is β-cyclohexylpropionyl; and Y is 1,7-heptylene.

30. N-(β-cyclohexylpropionyl) - N,N - bis-[6-4-cyclohexylmethyl-1-piperidyl)hexyl]amine according to claim 6 wherein $R_1$ is 4-cyclohexylmethyl; $R_3$ is β-cyclohexylpropionyl; and Y is 1,6-hexylene.

31. N-(β-cyclohexylpropionyl)-N,N - bis - [3-(4-cyclohexylmethyl-1-piperidyl)propyl]amine according to claim 6 wherein $R_1$ is 4-cyclohexylmethyl; $R_3$ is β-cyclohexylpropionyl; and Y is 1,3-propylene.

32. N-(2-carboxycyclohexylcarbonyl)-N,N - bis-[6-(4-cyclohexylmethyl - 1 - piperidyl)hexyl]amine according to claim 7 wherein $R_1$ is 4-cyclohexylmethyl; $R_3$ is 2-carboxycyclohexylcarbonyl; and Y is 1,6-hexylene.

33. N-cinnamoyl - N,N - bis-[6-(4-cyclohexylmethyl-1-piperidyl)hexyl]amine according to claim 8 wherein $R_1$ is 4-cyclohexylmethyl; $R_3$ is cinnamoyl; and Y is 1,6-hexylene.

34. N-cinnamoyl - N,N - bis-[5-(4-cyclohexylmethyl-1-piperidyl)pentyl]amine according to claim 8 wherein $R_1$ is 4-cyclohexylmethyl; $R_3$ is cinnamoyl; and Y is 1,5-pentylene.

35. N-cinnamoyl - N,N - bis-[4-(4-cyclohexylmethyl-1-piperidyl)butyl]amine according to claim 8 wherein $R_1$ is 4-cyclohexylmethyl; $R_3$ is cinnamoyl; and Y is 1,4-butylene.

36. N-cinnamoyl - N,N - bis-[3-(4-cyclohexylmethyl-1-piperidyl)propyl]amine according to claim 8 wherein $R_1$ is 4-cyclohexylmethyl; $R_3$ is cinnamoyl; and Y is 1,3-propylene.

37. N-succinoyl - N,N - bis-[6-(4-cyclohexylmethyl-1-piperidyl)hexyl]amine according to claim 9 wherein $R_1$ is 4-cyclohexylmethyl; $R_3$ is succinoyl; and Y is 1,6-hexylene.

38. N-(4-methylphenylsulfonyl) - N,N - bis-[6-(4-cyclohexylmethyl - 1 - piperidyl)hexyl]amine according to claim 10 wherein $R_1$ is 4-cyclohexylmethyl; $R_3$ as phenylsulfonyl bears a 4-methyl substituent; and Y is 1,6-hexylene.

39. N-(α,α,γ-trimethyl-β-oxovaleroyl) - N,N - bis-[6-(4-cyclohexylmethyl-1-piperidyl)hexyl]amine according to claim 11 wherein $R_1$ is 4-cyclohexylmethyl; $R_3$ is α,α,γ-trimethyl-β-oxovaleroyl; and Y is 1,6-hexylene.

References Cited

UNITED STATES PATENTS

| | | |
|---|---|---|
| 2,658,076 | 11/1953 | Krimmel. |
| 2,688,026 | 8/1954 | Krimmel. |
| 2,691,025 | 10/1954 | Clinton et al. |
| 2,826,578 | 3/1958 | Perron. |
| 2,870,145 | 1/1959 | Perron. |
| 3,105,072 | 9/1963 | Felder et al. |
| 3,145,215 | 8/1964 | Kirschner. |
| 3,154,557 | 10/1964 | Zenitz. |

HENRY R. JILES, Primary Examiner

R. T. BOND, Assistant Examiner

U.S. Cl. X.R.

260—268, 270, 271, 293, 293.4, 294, 294.3, 294.7; 424—250, 267

PO-1050
(5/69)

UNITED STATES PATENT OFFICE
CERTIFICATE OF CORRECTION

Patent No. 3,479,346            Dated    November 18, 1969

Inventor(s) Bernard L. Zenitz and Alexander R. Surrey

It is certified that error appears in the above-identified patent and that said Letters Patent are hereby corrected as shown below:

Column 8, line 5, "and" should read --was--; lines 5 and 6, "acetoneethanol" should read --acetone-ethanol. Column 9, Example 48, "(CH$_1$)$_3$" should read --(CH$_2$)$_3$--; Example 51, "(CH$_2$)$_3$" should read --(CH$_2$)$_2$--. Column 10, Example 78, "(CH$_2$)$_3$" should read --(CH$_2$)$_5$--. Column 11, line 28, "heater" should read --heated--; line 44, "cyclohexanecarboxyllc" should read --cyclohexanecarboxylic--. Column 12, line 47, "in" should read --of--; Examples 120 and 122, "2CH1" should read --2HCl--; Example 138, "COCH$_2$CH$_2$CO" should read --COCH$_2$CH$_2$CO--; Example 139, "C(H$_2$)$_3$" should read --(CH$_2$)$_3$--.

Columns 13 and 14, Example 146, "192.194.2" should read --192-194.2--; Example 152, "10.9-111.0" should read --109.0-111.0--. Column 15, Example 175, "182.2-184.0" should read --182.2-184.0--. Column 16, line 28, "is" should read --of--. Column 18, line 7, "cylohexylmethyl" should read --cyclohexylmethyl--; line 8, "3,5-(CH$_3$CONH)$_2$C$_6$H$_3$CO" should read --3,5-(CH$_3$CONH)$_2$C$_6$H$_3$CO--. Column 19, Example 116, Table 9, "156" should read --1.56--. Column 21, line 5, "asp. tetra-tera" should read --Asp. tetrapters--; Claim 1, line 65, ", R$_4$ and R$_5$" should read --, or R$_4$ and R$_5$ --, Claim 1, line 72, "cycloalkanecarbonyl" should read --cycloalkylcarbonyl--. Column 23, line 45, Claim 30, "[6-4-" should read --[6-(4- --.

SIGNED AND
SEALED

JUL 28 1970

(SEAL)
Attest:

Edward M. Fletcher, Jr.
Attesting Officer

WILLIAM E. SCHUYLER, JR.
Commissioner of Patents